Nov. 28, 1939.   D. F. ZOOK   2,181,444
FLIGHT INDICATOR
Filed Sept. 16, 1938   2 Sheets-Sheet 1
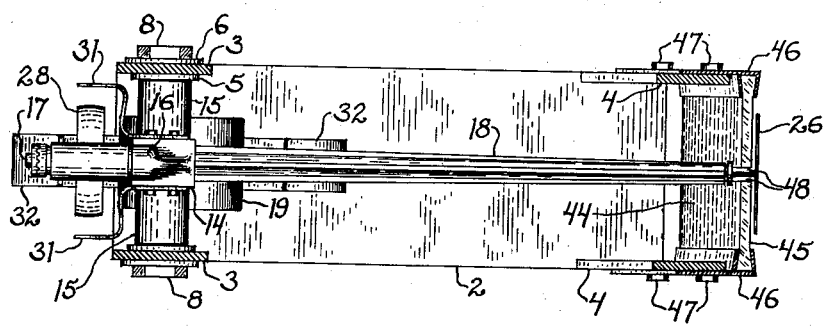
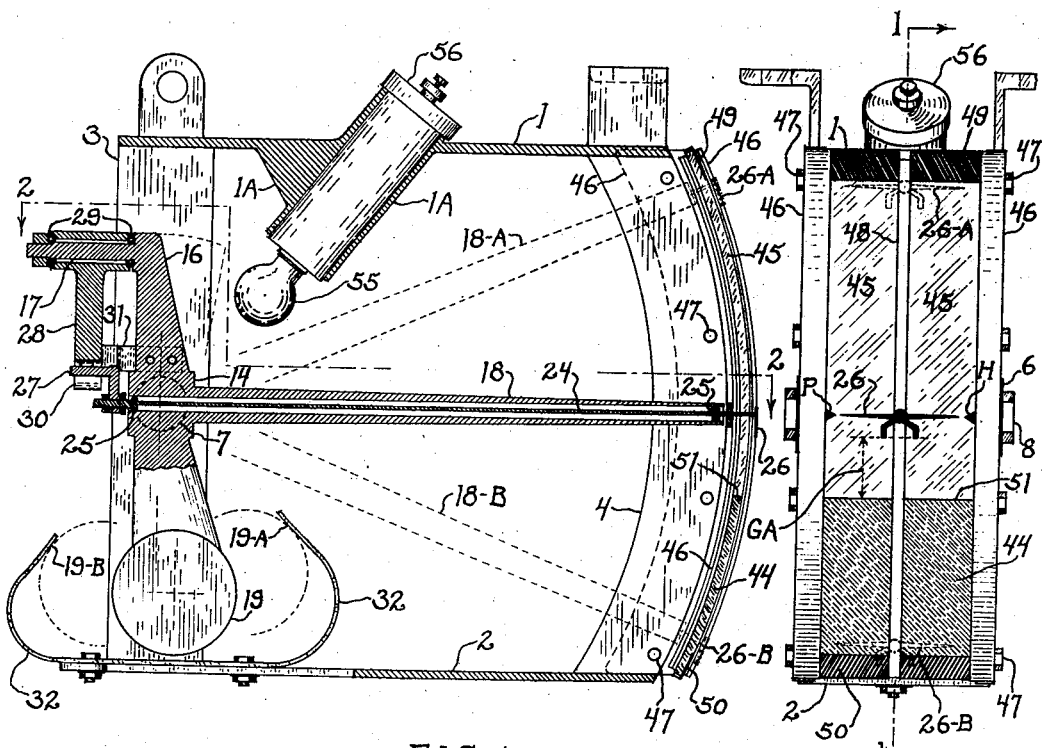
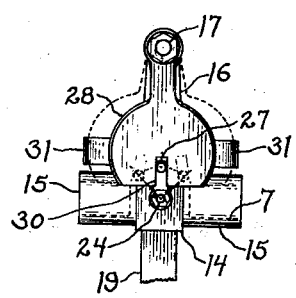

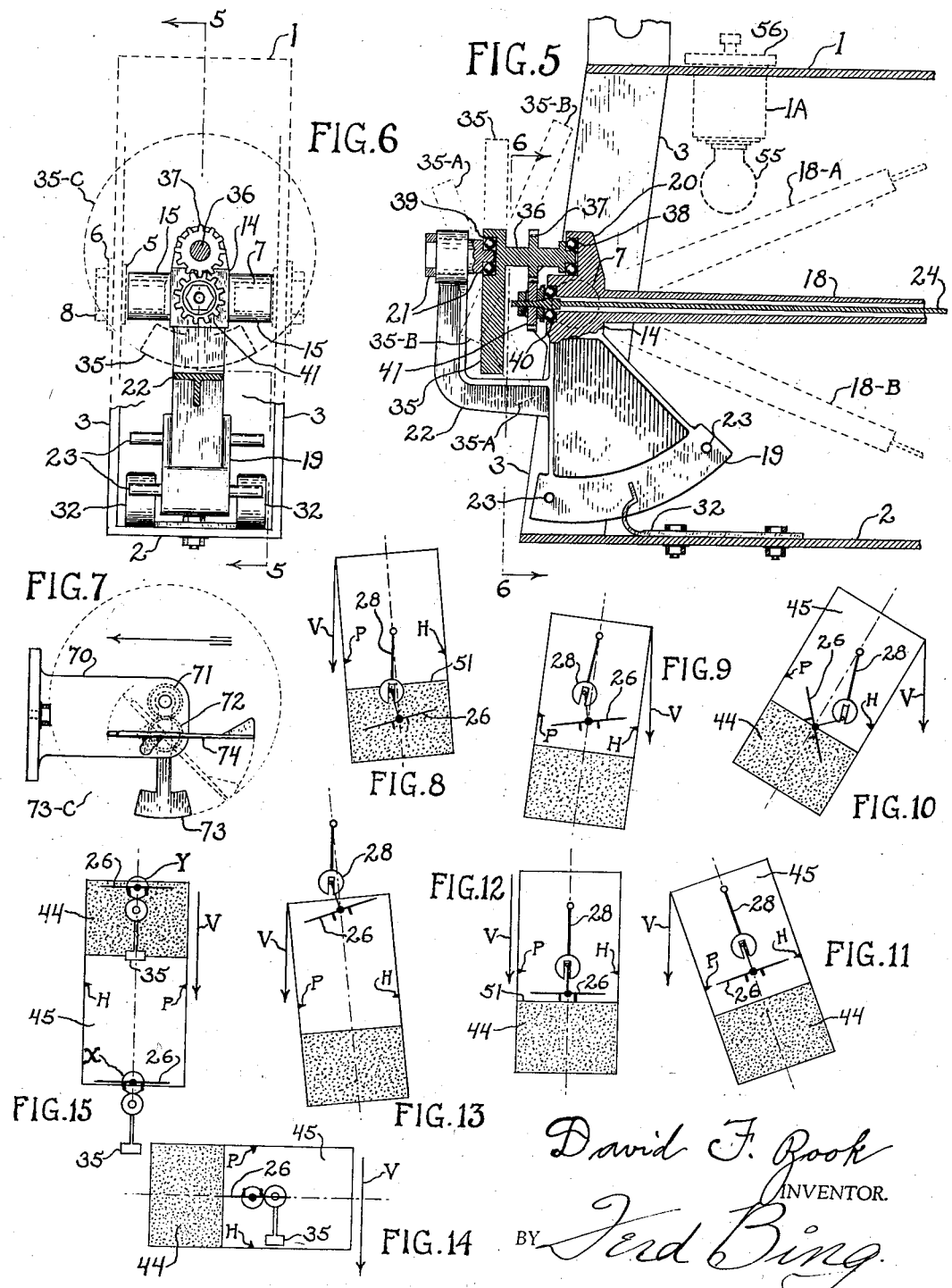

Patented Nov. 28, 1939

2,181,444

UNITED STATES PATENT OFFICE 2,181,444

FLIGHT INDICATOR

David F. Zook, Evanston, Ill.

Application September 16, 1938, Serial No. 230,284

11 Claims. (Cl. 33—215)

This invention pertains to aircraft, and is a device intended to be of assistance to the pilot of an airplane in maneuvering and controlling his craft in flight.

The primary object of this invention is to provide a flight indicator instrument that combines in one device the functions of several devices, thereby reducing the number of dials, etc. that must be observed.

A prime object is to incorporate in one instrument the means of informing the pilot whether he is flying a level course fore and aft, whether he is climbing or descending, whether his wings are level or transversely tilted, whether he is "skidding" or "sideslipping" on a turn, and whether he is bringing the plane down at the proper gliding-angle preparatory to landing.

An important object is to provide a conspicuous and distinctive instrument, different from all others in shape, color and illumination, and in effect forming before the pilot's eyes a miniature picture of his own plane in flight, and showing at a glance the correct or wrong positions, singly or in combination.

Another object is to provide a flight instrument especially to be of assistance to pilots when flying blind, as in fog, clouds, or through a stormy night.

Another object is to devise an instrument that might be useful in teaching students to fly, both in giving instruction in the air and in mechanically driven ground apparatus designed to simulate a plane in all of its maneuvers and positions.

An object is to provide an indicator that is small in size, light in weight, simple in construction, not costly to manufacture, and whose readings are so unmistakably obvious that no interpretative effort is required of a pilot.

Accompanying this specification are two sheets of drawings whose fifteen figures illustrate this invention and outline its manner of utility. In the drawings:

Fig. 1 is a side sectional view of one form of flight-indicator embodying the features of the invention, the view being taken on line 1—1 in Fig. 3.

Fig. 2 is a horizontal, sectional view through the same device, the view being taken on broken line 2—2 in Fig. 1.

Fig. 3 is a front elevation view of the device, and depicts the instrument as a pilot would observe it when it was mounted in place.

Fig. 4 is a rear elevation view of the pivoted pointer assembly, showing the actuating pendulum.

Fig. 5 is a side or vertical sectional view of a portion of a modified type of flight-indicator, the view being taken on broken line 5—5 in Fig. 6 and illustrating the actuating means.

Fig. 6 is a rear sectional view of the lower portion of the device shown in Fig. 5, and depicts the mounting and actuating means of the pivoted pointer mechanism.

Fig. 7 is a side elevation view of another form of a flight indicator, this form giving no indications of lateral balance, but a complete circle of longitudinal positions of the plane, as in looping.

Figs. 8 to 15 inclusive represent the face or "picture front" of the indicator in different plane maneuvers, and show the pointer, resembling the end view of an airplane, in various indicative positions. Complete description of these latter figures will be given later on in this specification. In conjunction with the pointer in Figs. 8 to 15 is shown the pendulum, actuating means for clarity of disclosure. In practice, the pendulum of course does not show on the indicator face.

Following is a description of the various numbered parts in the accompanying drawings, and their relation to each other, like numbers being applied to like parts in all the figures.

In the form chosen for disclosure in Figs. 1 to 4 of the drawings the indicator mechanism is supported and mounted on a frame structure having a top member 1, a bottom member 2, rear side members 3 and front side members 4. Throughout this description the "front" of the indicator device is referred to as that face which is observed by the pilot. As clearly shown in Fig. 1 the two front side members 4 are formed with a convex curve to the front.

On the median portion of the rear side members 3 are inside bosses 5 and outside bosses 6 to re-inforce these members for the support of the indicator mechanism. The movable indicator mechanism is pivoted on anti-friction trunnion bearings indicated by 7, (Fig. 4) with adjustment nut 8. This pivoted mechanism may be of several assembled parts, or, as in this instance, its principal members may consist of a single casting. As illustrated, a central pivot-block 14 is formed integral with two bearing sleeves 15, a vertical arm 16, a bearing pin 17, a pointer support-tube 18, and a counter-weight 19. This entire unit is pivoted upon the trunnion bearings 7, and rotates upon them to a limited extent.

Within the support-tube 18 is carried a pointer-rod 24 with an integral bearing ring 25 at each end, and an indicator-pointer 26 formed to resemble the end view of an airplane mounted at the outer or free end of the rod 24. On the inner or trunnion end of the rod 24 a crank-pin 27 is attached, with the crank projecting vertically upward when the plane-like pointer 26 is in a horizontally level position. A pendulum 28 is mounted on the pin 17 upon anti-friction bearings 29. The pendulum has a slot 30 at its lower free end, closely fitting either side of the crank-pin 27. The pendulum is free to swing in a transverse direction to a limited extent, the maximum amount determined by the spring-stops 31, which are attached to the sides of arm 16.

As the described pivoted mechanism is free to swing upon its transverse bearings 7 the outer or free end of tube 18 and the pointer 26 describe a vertical arc. In its use as an indicator the pointer 26 is allowed to swing practically the height of the device, or most of the distance between members 1 and 2. The pointer is prevented from too great a movement by the counter-weight 19 coming in contact with a spring-stop 32 in its forward or backward motion.

The front or indicating-face of the device consists of two curved glass plates, each plate having a lower portion preferably stained brown as indicated by 44, and a larger arc above preferably of light blue as at 45. Each of these curved, dual-colored glass plates is secured in a curved clip 46, which are fastened to the sides of members 4 by several bolts 47. The plates 44—45 are of such a width that when the two clips 46 are attached to the sides of the device the inner edges of the plates do not meet, but leave a slot 48 extending from top to bottom of the glass front of the device. When mounted these plates 44—45 lie immediately behind the pointer 26, (see Fig. 2) their curvature corresponds to the arc described by the pointer 26, and the outer end of rod 24 carrying the pointer 26 is free to travel up and down the slot 48 as the instrument may be tilted.

A suggested means of illuminating this flight indicator is by an inside mounted electric light 55, carried by a quickly removable socket 56, which in turn is inserted in the frame mounting 1A. When this inside light 55 is turned on the glass front of the indicator appears as an illuminated window, with blue glass 45 above representing sky and brown glass 44 below representing ground. However, other means of illumination may be preferred.

The foregoing description of numbered parts applies to the form of flight-indicator illustrated in Figs. 1 to 4 inclusive. In Figs. 5 and 6 a modified form of mechanism for actuating the pointer is depicted. In this form the front or "face" of the device with pointer, glass window, clips, etc. are identical with that shown in Figs. 1 and 2 and 3, and so these parts are not illustrated again. Also, much of the pivoted mechanism is the same, the pivot-block 14, bearing-sleeves 15, pointer-tube 18, and counter-weight 19 being as before described.

But whereas, in the first four figures the pendulum 28 was only allowed a slight swing transversely, in Figs. 5 and 6, the pendulum 35 of the embodiment of Fig. 5 is allowed to rotate transversely in a complete circle, unhampered by any stops. This pendulum 35 is a unit with its shaft 36 and a spur gear 37. This pendulum unit is carried on a front anti-friction bearing 38 and a similar rear bearing 39. The bearing 38 is housed within a boss or short arm 20, forming a vertical projection on the pivot-block 14. The rearward bearing 39 is formed within the pendulum unit itself, and is aligned by an adjustable retainer 21 which is carried by a right-angle support arm 22 forming an integral part of the counter-weight 19.

The rear or trunnion end of the pointer rod 24 is carried on an anti-friction bearing 40, and a spur gear 41 is firmly attached to this rod end. Gears 37 and 41 are retained in mesh, both have the same number of teeth, and they are assembled so that with the pendulum 35 hanging vertically the pointer-plane 26 will be in correct horizontal position, as in Fig. 3.

The pivoted mechanism in this, as in the previously described form, is prevented from rotating too far on its bearings 7 by pins 23 on the counter-weight 19, which contact a spring-stop 32 at the correct maximum positions.

In Fig. 7 another form of flight-indicator is depicted, this being a side elevation view. A mounting-bracket 70 attaches the device to the instrument-board or other support. The arrow in the figure shows the direction of the plane's flight. Two meshed gears 71 and 72, with equal number of teeth, are carried by member 70 on transverse bearings. A pendulum 73 is firmly attached to gear 71 and a "model-plane" 74 is fastened to the shaft of gear 72. Gears 71 and 72 are assembled so that with pendulum 73 hanging vertically the model-plane 74 will appear level, fore and aft. This will correspond with the airplane's actual position, fore and aft in level flight and the model plane will duplicate by its inclination the actual longitudinal inclination of the aircraft in which it is installed. If the airplane dips its nose downwards the pendulum 73 will swing forward, maintaining the perpendicular, and rotates its attached gear 71. Gear 71 in mesh with gear 72 consequently rotates the latter through the same arc, and the shaft of gear 72 carrying the "model plane" 74 is rotated, so that the "nose" or front end of 74 is inclined downwards in relation with the airplane's horizontal axis, fore and aft.

If the plane climbs upwards the reverse occurs, the pendulum 73 swings rearward and the model 74 points its nose upward. If the plane dives and then "loops" the pendulum first swings forward, putting the "model" into a "dive". Then as the plane climbs and turns over backwards the pendulum follows by rotating backwards through the complete circle 73—C. The model follows suit and "loops the loop" in unison with the plane, and in the same direction of rotation.

As stated early in this specification the device shown in Fig. 7 does not indicate lateral inclinations, only longitudinal positions. The upper surface of model plane 74 would be colored white, the lower surface red, to render its indications more conspicuous to the pilot.

The operation of the various flight-indicators will now be briefly stated, first discussing the instrument as shown in Figs. 1 to 4. The assembly of pivoted mechanism carried on trunnion bearings 7 is so designed that the counter-weight 19 maintains the tube member 18 in a horizontal position, and the device is mounted in an aircraft in such a manner that when the aircraft is in normal horizontal flight the instrument will be exactly level, fore and aft, and the pointer 26 will register at the mid-point of the indicator's face. This mid-point in level flight may be termed the "plane horizon", and in Fig. 3 the two markers "P" and "H" adjacent the wing-tips of pointer 26 stand for this artificial "plane horizon". The pivoted mechanism is allowed, in this particular case, a total rotation of 45°, or 22½° above and 22½° below the horizontal. The great majority of airplanes will do all their flying, taking off, and landing, within these angles. When a plane takes off and climbs upward the indicator will be equally tilted, but the counterweight 19 maintains the pointer 26 on the horizontal level. Hence the pilot sees the pointer 26 at some distance above PH, showing the plane is climbing. In descending the reverse occurs, the pointer 26 falls below PH, indicating the plane is coming down. As before stated, a spring-stop 32 prevents too great a movement of the pivoted mechanism. If plane should climb very steeply the weight 19 would contact the stop 32 as at 19A, at which time the tube 18 would be in position 18A, and pointer 26 would be at 26A, indicating the plane was at an excessively steep climbing angle, approaching a stall. This is a danger point, hence the extreme top of the indicator glass 45 is colored red, represented by 49, as a warning.

Should the plane descend at an excessive angle the weight 19 contacts the stop 32 as at 19—B, the tube 18 then being at position 18—B and pointer 26 registering an excessive angle of descent by its position at 26—B. As a warning against an extreme angle of descent the lowest portion of indicator glass 44 is colored red, represented by 50.

This flight indicator incorporates a means of informing a pilot when he is gliding in at a safe and proper angle preparatory to making a landing. In Fig. 3 the pointer 26 or "model plane" is seen in horizontal flight, level with PH. These markers PH are some distance above the "ground line" 51, the line where the blue glass 45 (sky) meets the brown glass 44 (ground). The distance between the "wheels" of the model plane 26 and this "ground line" 51 is represented by the letters GA, which stand for "gliding angle". Thus, when the plane is put into the proper gliding angle the pointer 26 will descend on the indicator front until its "wheels" just touch the ground line 51. In Fig. 12 this maneuver is illustrated, the "model plane" 26 is depicted as it would appear to a pilot gliding in at the correct angle preparatory to landing.

Thus far only the longitudinal inclination or position of the airplane has been discussed. The present flight indicator also incorporates means of registering lateral or transverse inclinations as well. Referring again to Figs. 1 to 4 it will be observed that the pendulum 28 is allowed a small amount of transverse swing. If either wing of the plane dips low the pendulum swings toward the down side, the notch 30 in the pendulum immediately moving the closely-fitting crank-pin 27 toward the same side. This crank-pin 27 being attached to rod 24 will rotate the rod accordingly and the pointer 26 at the rod-end. Hence, if the left wing of the plane is too low the pendulum 28 swings to the left, moves the crank-pin 27 to the left which in turn rotates the pointer 26 on the indicator front and shows "left wing too low".

The plane may go through various maneuvers, turns, banks, etc., and so long as it maneuvers correctly the pointer 26 will remain level transversely with markers PH, but if it fails to bank and turn properly the pointer 26 shows lateral unbalance and what must be done to correct it.

All of these desirable lateral indications occur regardless of the longitudinal inclination of 26 on the plane, or of the vertical position of 26 on the indicator front as will hereinafter be explained. The instrument illustrated in Figs. 1 to 4 will greatly exaggerate any transverse unbalance, for it will be seen in Fig. 4 that while the pendulum can only swing a total of about 20° it causes the pointer rod 24 to rotate 90°.

In the six figures from 8 to 13 inclusive there are represented the indicator-fronts during six different maneuvers of a plane, with the device as illustrated in Figs. 1 to 4 installed. The tilting of the figures represents the actual lateral position of the plane, the arrows V on each figure denoting true vertical to the ground.

In Fig. 8 the pointer 26 is considerably below PH, it is even lower than the ground-line 51, and the left wing indicates "low". This verifies the arrow V, drawn vertically, showing the plane is tilted down towards the left. Fig. 8 indicates the plane is descending at a steep angle with the left wing too low.

Fig. 9 indicates a "skid" to the left. The inclination of the entire figure shows that the right wing is down a little, but the pointer 26 reads "left wing too low." A sharp turn is being made to the right without enough "bank". Consequently the action of centrifugal force due to the turn causes the pendulum 28 to swing towards the outside, or to the left, and so as to tilt the pointer 26 down on that side. The plane being in a "skid" because the wings lack the proper "bank", Fig. 9 indicates the plane is in horizontal flight but "skidding" on an improperly banked turn.

In Fig. 10 is represented a plane turning to the right with too much "bank" for the length of the turn. The air support under the wings becomes insufficient and the plane "side-slips" to the right. The pendulum 28 falls to the lower side, carrying the pointer 26 to the position shown. This movement of the pendulum results from the predomination of gravity over the centrifugal force caused by the turn.

Fig. 10 indicates that the plane is descending at a good angle longitudinally, but is "side-slipping" to the right because of over-banking.

In Fig. 11 is represented a plane making a properly banked turn to the left. The inclination of figure shows the plane has considerable tilt to the left, but the speed of plane and length of turn are correct for this degree of bank, hence the pendulum, acted upon equally by gravity and centrifugal force, remains motionless, holding the pointer 26 level with PH. Fig. 11 indicates a plane flying in a horizontal direction, and making a correctly banked turn to the left.

Fig. 12, as stated previously, indicates a plane descending at the correct gliding angle preparatory to landing. The "wheels" just touch the ground line 51 and the wings are transversely level.

Fig. 13 indicates a plane climbing at such a steep angle that it is approaching the "stalling" point, and is also falling off with the left wing too low. When a plane has reached this critical climbing angle the pointer 26 will give warning by its proximity to the red colored glass 49 (see 26—A in Fig. 3).

With the pendulum 28 as in Figs. 1 to 4 the maximum lateral tilting of the pointer 26 is 45°, (see Fig. 10). The stop 31 prevents the pendulum from swinging so far that proper control of the pointer would be lost. In the device illustrated in Figs. 5 and 6 the pendulum 35 has an unrestricted swing in a complete circle, shown by dotted line 35—C in Fig. 6. If the plane is put into a steep climb the pointer-tube 18 may attain position 18—A (Fig. 5) and the pendulum 35 would rotate in the path 35—A, indicated by dotted lines. If the plane descends at a steep angle, the tube 18 may reach position 18—B and the pendulum would swing in the path 35—B, see dotted lines. The pendulum 35 would swing or rotate only if the plane were transversely tilted. With the full-swinging pendulum geared to the pointer-rod, as illustrated in Figs. 5 and 6, there is no exaggeration of a plane's lateral inclination. The swing of the pendulum 35 rotates the pointer 26 the same number of degrees, and in the same direction as the plane is inclined.

Thus, if a plane were to perform a "barrel-roll" maneuver, a complete transverse rotation on a longitudinal axis, the device shown in Figs. 5 and 6 would indicate to the pilot the full maneuver. Fig. 14 represents the indicator in a plane that has turned one-quarter of a revolution on its fore-and-aft axis. The pendulum 35 has rotated the pointer 26 through 90°. The pilot, strapped in, sees the "model plane" 26 at right angles with PH (plane horizon). When the plane has revolved through a half-circle and is upside down, the pendulum has rotated the pointer likewise, and the pilot, now hanging head down, sees the pointer inverted on the indicator-face (see Fig. 15). This Fig. 15 is drawn inverted, the true position of the plane, so the sheet must be turned end for end to see the indicator face as the pilot would see it. Also, with either form of indicator, when the plane had reached approximately the inverted position the counter-weight 19 would suddenly shift the pointer 26 from position X to position Y—or vice versa (Fig. 15) as it passed above its support bearings 7.

Thus it will be seen that in the flight-indicators illustrated in Figs. 1 to 6 an effort is made to form before the pilot's vision a "picture" of his own plane in flight. Illuminated blue glass represents the sky, brown glass the ground. An artificial, or plane horizon PH remains fixed on the indicator face. A "model plane" 26, simulating his own plane rises or falls on the indicator, as his plane climbs or descends. The wings of the model tilt or incline as his plane inclines. If his plane rolls completely over the indicator model, (in one form of the device) rolls over likewise. If the pilot banks incorrectly while turning, the model shows him if his plane is "skidding" or "side-slipping". If the pilot wishes to gauge the best angle to glide towards a landing he brings the "wheels" on the model down until they touch the brown glass level, indicating "ground".

In ordinary flying and in various maneuvers what the pilot sees on the indicator face duplicates what an observer on the ground sees as he watches the actual plane in flight. The earth's horizon and the "indicator horizon" PH may not coincide, but the pilot sees a model plane 26 performing in relation to "its horizon" precisely as his airplane is performing in relation with the "earth's horizon".

In blind or other difficult flying conditions it might be helpful if a pilot had a clear, unmistakable, "miniature picture" of his own plane in flight, (best shown in Fig. 3), and it is the intent and effort of the present disclosure to provide that, so far as possible.

The longitudinal, inclination-indicator shown in Fig. 7 has been described, and its operation needs no further discussion. The plane's longitudinal positions are faithfully duplicated by the model 74.

In the various figures illustrating these flight indicators, no damping mechanism is shown, or means to reduce too rapid oscillations of the pointer-tube 18. However, it is contemplated that if an airplane's vibration or sudden movements cause too violent shifting up and down of the pointer 26, a damping device of conventional construction will be applied to the pivoted indicating mechanism.

I claim as my invention:

1. In a flight indicator for air-craft, an instrument having suitable frame structure with attachments for fastening said indicator to the instrument-board of an air-craft, transverse trunnion bearings mounted in said frame structure, a pivoted indicating mechanism mounted upon said trunnion bearings and adapted to swing in a restricted arc in a longitudinal, vertical plane, said pivoted mechanism incorporating a pointer-tube normally maintained in a horizontal position by a counter-weight, said pivoted mechanism including a support and longitudinal bearing for a pendulum, said pivoted mechanism including a pendulum adapted to swing transversely in a restricted arc upon its longitudinal bearing, said pivoted mechanism incorporating a pointer-rod within said pointer-tube, a pointer on said rod at the free end of said pointer-tube to indicate the rotative position of said rod, a crank-arm on said rod at the supported end of said pointer-tube, said crank-arm, pointer-rod and pointer being actuated rotatably by said pendulum, a curved glass window-front for said indicator device, an upper portion of said window-front being of blue glass to represent sky, a lower portion of said window-front being of brown glass to represent ground, said window-front comprising two halves separated vertically by a slot, said slot permitting the vertical oscillation of said pointer, said pendulum actuating the transverse inclination of said pointer, and an interior light for illuminating the transparent, dual-colored window-front of said flight indicator.

2. In a flight indicator for air-craft, a frame structure, transverse trunnion bearings in said frame structure, a pivoted indicating mechanism mounted upon said trunnion bearings and adapted to swing in a restricted arc in a longitudinal, vertical plane, said pivoted mechanism incorporating a pointer-tube, a counter-weight normally maintaining said pointer tube in a horizontal position, said pivoted mechanism including a support and a longitudinal bearing means for a pendulum, a pendulum mounted in said bearing means and adapted to swing transversely in a complete circle upon said longitudinal bearing means, a pointer-rod within said pointer-tube, a pointer on said rod at the free end of said pointer-tube to indicate the rotative position of said pointer-rod, a gear on said rod at the supported end of said pointer-tube, a gear fixed to said pendulum and in mesh with the gear of said rod, said gears, said pointer-rod and said pointer being capable of complete rotation by the associated actuating pendulum, a curved glass window-front for said indicator, an upper portion of said window-front being of blue glass to represent sky, a lower portion of said window-front being of brown glass to represent ground, said window front comprising two halves separated by a vertical slot, said slot permitting the vertical oscillation of said pointer, said pendulum actuating and controlling the transverse inclination of said pointer, and an interior light for illuminating the transparent, dual-colored window front of the device.

3. In a flight indicator for air-craft, a frame structure adapted to be attached to the instrument-board of an air-craft, pivoted indicating mechanism supported in said frame structure upon transverse bearings, said pivoted mechanism incorporating a pointer-tube, a pointer-rod within said tube, a pointer on the free end of said rod, a transversely swinging pendulum mounted on said pivoted mechanism, means operatively connecting said pointer-rod with said transversely swinging pendulum, and a counter-weight operable to maintain said pointer-tube in a normally horizontal position, a curved glass window-front for said indicator device, an upper portion of said window-front being of blue glass to represent sky, a lower portion of said window-front being of brown glass to represent ground, said indicator device being so mounted upon an aircraft instrument-board that when the aircraft is in horizontal flight the said pointer-tube and pointer will be at the mid-point vertically upon the said indicator window-front, said mid-point upon the said window-front being provided with markers constituting a fixed artificial horizon, a ground-line formed by the juncture of said blue glass representing sky and said brown glass representing ground disposed at some distance below said markers or artificial horizon, and said indicator-pointer formed to represent the end view of an airplane.

4. In a flight indicator for air-craft, a frame structure adapted to be attached to the instrument-board of an air-craft, a pivoted indicating mechanism supported in said frame structure upon transverse bearings, said pivoted mechanism incorporating a pointer arm and pointer normally maintained in a horizontal position by a counter-weight, said pivoted mechanism being free to oscillate in a restricted arc in a longitudinal, vertical plane, a curved glass window-front for said indicator device, an upper portion of said window-front being of blue glass to represent sky, a lower portion of said window-front being of brown glass to represent ground, markers at the mid-point vertically on said window-front constituting a fixed, artificial horizon, a ground line formed by the juncture of said blue glass and said brown glass disposed at a pre-determined distance below said markers or artificial horizon, said indicator pointer formed to represent the end view of an airplane including depending landing-wheels, said airplane-like pointer indicating longitudinal level flight when its wing-tips are at same height as said markers, said airplane-like pointer indicating the said aircraft is at the proper gliding-angle preparatory to landing when the said depending landing-wheel portion of said pointer just touches the said ground-line on indicator window-front, and said window-front having red glass portions at the extreme upper and lower edges indicating excessive or dangerous angles of climb and descent.

5. In a flight indicator for air-craft, a suitable frame structure adapted to be attached to the instrument-board of an air-craft, a pivoted indicating mechanism supported on said frame structure upon transverse bearings, said pivoted mechanism incorporating a pointer arm and pointer normally maintained in a horizontal position by a counter-weight and free to oscillate in a restricted arc in a longitudinal, vertical plane, a curved glass window-front for said indicator device, an upper portion of said window-front being of blue glass to represent sky, a lower portion of said window-front being of brown glass to represent ground, markers at the mid-point vertically on said window-front constituting a fixed, artificial horizon, a ground-line formed by the juncture of said blue glass and said brown glass disposed at a pre-determined distance below said markers or artificial horizon, said indicator pointer formed to represent the end view of an air-craft, said pivoted mechanism providing the means both to move said pointer vertically upon said indicator window-front and to tilt transversely the said pointer, said vertical and transverse motions of said aircraft-like pointer being the only moving element on the said indicator-front, said markers or artificial horizon being fixed, said ground-line being fixed, said stationary features of said indicator-front supplementing the fixed objects surrounding the pilot in the cockpit of said air-craft, said single movable, indicating element on said indicator-front operating to provide a simple, natural, and obvious indication of said air-craft's true position or maneuver, and said single movable, indicating element providing the pilot of said air-craft with instant and unmistakable flight-indicator readings of a nature that requires no interpretative effort.

6. In a mechanically actuated flight indicator for air-craft, the combination of frame structure adapted for attachment to the instrument-board of an air-craft, pivoted indicating mechanism supported upon transverse bearings by said frame structure, an indicating pointer mounted on said pivoted mechanism for movement generally vertically and for transverse inclining movement, said vertical and transverse movements of said pointer being capable of being made singly or in unison, said pointer being formed to represent the end view of an airplane, a curved glass indicator-front along and in relation to which said plane-like pointer moves, an upper portion of said indicator-front being of blue glass representing sky, a lower portion of said indicator-front being of brown glass representing ground, marking means constituting a fixed, artificial horizon at the mid-point vertically of said indicator-front, a ground line formed by the juncture of said blue glass and said brown glass disposed at some distance below said marking means or artificial horizon, an interior light to illuminate said glass indicator-front, said plane-like pointer being the sole moving, indicating element on the face of said indicator-front, said disposal of indicator elements simulating an illuminated miniature picture in realistic coloring with a model plane-like pointer in silhouette, said artificial horizon and ground line being stationary, said dual-colored glass in said indicator-front clearly representing sky and ground, and said airplane-like pointer simulating in its vertical movements and transverse inclinations the positions and maneuvers of the aircraft in which said indicator is installed.

7. In a flight indicator for air-craft, a frame structure adapted to be mounted on the instrument-board of an air-craft, transverse trunnion bearings mounted in said frame structure, a pivoted indicating mechanism mounted in said trunnion bearings and adapted to swing in a restricted arc in a longitudinal, vertical plane, an indicator rod rotatably mounted on said pivoted mechanism so as to project radially with respect to the axis of said trunnion bearings, a counter-weight on said pivoted mechanism operable normally to maintain said mechanism in a position wherein said rod is horizontal, said mechanism also embodying longitudinal bearing means for a pendulum, a pendulum mounted on said longitudinal bearing means and adapted to swing therein, a pointer on said indicator rod at the remote end thereof to indicate the rotative position of said rod, means forming an operative rotation-transmitting connection between said pendulum and said indicator rod, and an indicator face cooperating with said pointer to provide a composite indication based on the positioning of said rod relative to said lonigtudinal and transverse axes.

8. In a flight indicator for aircraft, a frame structure, transverse bearings in said frame structure, a pivoted indicating mechanism mounted upon said transverse bearings and adapted to swing through a substantial arc in a longitudinal, vertical plane, said pivoted mechanism incorporating a pointer-tube, a counter-weight normally maintaining said pointer tube in a horizontal position, said pivoted mechanism including a support and a longitudinal bearing means for a pendulum, a pendulum mounted in said bearing means and adapted to swing transversely in a complete circle upon said longitudinal bearing means, a pointer-rod within said pointer-tube, a pointer on said rod at the free end of said pointer-tube to indicate the rotative position of said pointer-rod, a gear on said rod at the supported end of said pointer-tube, a gear fixed to said pendulum and in mesh with the gear of said rod, said gears, said pointer-rod and said pointer being capable of complete rotation by the associated actuating pendulum, and an indicator face cooperating with said rod and said pointer.

9. In a flight indicator for air-craft, a frame structure adapter to be mounted on the instrument board of an air-craft, transverse bearings in said frame structure, a pivoted indicating mechanism mounted upon said transverse bearings and adapted to swing through a substantial arc in a longitudinal, vertical plane, said pivoted mechanism carrying a rotatably mounted pointer-rod projecting radially with respect to the axis of said transverse bearings, means acting on said pivoted indicating mechanism to normally maintain said pointer rod in a horizontal position, said pivoted mechanism including a support and a longitudinal bearing means for a pendulum, a pendulum mounted in said bearing means and adapted to swing transversely, a pointer on said rod at the projecting end thereof to indicate the rotative position of said pointer-rod, rotation transmitting means between said pendulum and said pointer rod, and an indicator face stationarily mounted on said frame structure for cooperation with said pointer-rod and said pointer, said indicator face having an artificial horizon stationarily depicted thereon.

10. In a flight indicator for air-craft, a frame structure adapted to be attached to the instrument-board of an air-craft, a pivoted indicating mechanism supported in said frame structure upon transverse bearings, said pivoted mechanism incorporating a pointer arm and pointer normally maintained in a horizontal position by a counter-weight, said pivoted mechanism being free to oscillate in a restricted arc in a longitudinal, vertical plane, an indicating face stationarily mounted on said frame structure for cooperation with said indicating pointer, the upper and lower portions of said indicating face being of contrasting colors to represent sky and ground respectively, the juncture of said contrasting colors defining an artificial ground-line, and means on said face above said ground line defining a fixed, artificial horizon, said indicator pointer being formed to represent the end view of an airplane including depending landing-wheels, said airplane-like pointer indicating longitudinal level flight when its wing-tips are at the height of said artificial horizon, said airplane-like pointer indicating that the said aircraft is at the proper gliding-angle preparatory to landing when the said depending landing-wheel portion of said pointer just registers with the said ground-line.

11. In a self-contained pendulum-type of flight or angle indicator for aircraft, a suitable frame for attaching said indicator to the instrument panel of said aircraft, said frame providing transverse bearings, a counter-weighted, pivoted indicating mechanism mounted in said bearings, said indicating mechanism incorporating and carrying a transversely-swinging pendulum, said indicating mechanism including a pointer-member normally maintained in a horizontal position by said counter-weight, said transversely-swinging pendulum being geared to said pointer-member to actuate the same, said counter-weighted indicating-mechanism permitting said pointer-member to rise and fall through a substantial arc in a longitudinal vertical plane, said transversely-swinging pendulum actuating said pointer member in transverse inclination and being capable of controlling said pointer-member throughout a complete circle, said pendulum operating to incline said pointer transversely in the same direction and to the same degree as said aircraft's wings are transversely inclined, said indicating mechanism having a fixed front face cooperating therewith, said fixed front face having stationary marking means including an artificial horizon thereon.

DAVID F. ZOOK.